(12) United States Patent
Watson, Jr.

(10) Patent No.: US 11,350,789 B2
(45) Date of Patent: Jun. 7, 2022

(54) PLATFORM HAVING MULTIPLE ADJUSTABLE WORK AREAS

(71) Applicant: John Watson, Jr., Saint Louis, MO (US)

(72) Inventor: John Watson, Jr., Saint Louis, MO (US)

(*) Notice: Subject to any disclaimer, the term of this patent is extended or adjusted under 35 U.S.C. 154(b) by 171 days.

(21) Appl. No.: 16/833,941

(22) Filed: Mar. 30, 2020

(65) Prior Publication Data

US 2020/0221902 A1    Jul. 16, 2020

Related U.S. Application Data

(63) Continuation-in-part of application No. 16/023,237, filed on Jun. 29, 2018, now Pat. No. 10,638,880.

(51) Int. Cl.
| | |
|---|---|
| *A47J 37/07* | (2006.01) |
| *F24B 1/20* | (2006.01) |
| *B62D 63/08* | (2006.01) |

(52) U.S. Cl.
CPC ....... *A47J 37/0731* (2013.01); *A47J 37/0786* (2013.01); *B62D 63/08* (2013.01); *F24B 1/207* (2013.01)

(58) Field of Classification Search
CPC .... A47J 37/0731; A47J 37/0786; A47J 37/07; F24B 1/207; B26H 3/00; B62D 63/08; B62D 63/61; B62D 63/065; B62D 63/066; B62D 25/24; B62D 27/06; B62D 21/09; B62B 3/00
USPC ......................................... 280/47.35; 211/97
See application file for complete search history.

(56) References Cited

U.S. PATENT DOCUMENTS

| | | | | |
|---|---|---|---|---|
| 1,688,456 | A * | 10/1928 | Dolph | A47B 83/045 312/197 |
| 3,853,329 | A * | 12/1974 | McDonald | B62B 3/00 280/47.35 |
| 5,846,043 | A * | 12/1998 | Spath | B67D 3/0029 414/343 |
| 9,402,508 | B2 * | 8/2016 | Cothern | A47J 37/07 |
| 2012/0145978 | A1 * | 6/2012 | Rich | B62B 3/0606 254/2 R |
| 2012/0286484 | A1 * | 11/2012 | Gonzalez | B62B 5/0003 280/30 |

* cited by examiner

Primary Examiner — Jorge A Pereiro
Assistant Examiner — Nikhil P Mashruwala
(74) Attorney, Agent, or Firm — Douglas E. Warren (57) ABSTRACT

A platform having adjustable working areas that can be repositioned from a stored position to an operational position on the platform wherein each of the work areas are horizontally adjustable to allow each of the work areas to be independently adjustable.

11 Claims, 5 Drawing Sheets

PLATFORM HAVING MULTIPLE ADJUSTABLE WORK AREAS

CROSS REFERENCE TO RELATED APPLICATIONS

This application is a Continuation-In-Part (CIP), and claims priority benefit with regard to all common subject matter, of earlier-filed non-provisional U.S. patent application Ser. No. 16/023,237 filed on Jun. 29, 2018, and the entire disclosure of the that earlier-filed application is incorporated herein by reference in its entirety for all purposes.

STATEMENT REGARDING FEDERALLY SPONSORED RESEARCH

Not Applicable.

BACKGROUND OF THE INVENTION

Within a wide range of applications and industries there are instances where there is a need for a single platform assembly that includes a variety of multiple work areas where each work area is separately adjustable to increase the working efficiency at each work area. For example there are work conditions within the farming industry, the oil industry, the municipal service industry, the disaster relief industry, and within the military where such a platform having a plurality of separately adjustable work areas would be beneficial to the completion of the specific tasks that would be required within each of those industries.

One specific example is within the outdoor cooking industry. Such outdoor cooking is very common at a variety of outdoor events such as faith-based events, picnics, fund raisers, weddings, family reunions, community festivals, and backyard barbeques that bring people together. At such events, there are a very large variety of foods that are prepared. Often, each of those foods is required to be cooked separately and at different temperatures.

Additionally, when such cooking events take place, the people that are assigned the task of cooking at these events are usually required to transport all the equipment to the area where the event will be held. That equipment usually includes multiple and/or different cooking devices. The transportation of that equipment to the location of is normally accomplished by obtaining a trailer and then having the cooking personnel physically load all the things needed for the event. Those same personnel are then required to transport that cooking equipment to the event, and then unload and assemble those cooking devices at the event location. Because space at the event location can be limited or awkward, the final arrangement of the cooking devices can be inefficient and sometimes even very unsafe. When the event is over, those same cooking personnel must disassemble the cooking devices, reload those cooking devices onto the transportation vehicle, and unload that equipment at the final location where the cooking equipment is stored until needed again at another event. Most outdoor cooking systems having more than a single cooking device are normally assembled and set up in a manner that often makes cooking at the event very inefficient, and sometimes dangerous, as the cook moves between each of the cooking devices.

To remove many of these issues, it would be desirable to incorporate a common residential cooking rule know as the Kitchen Triangle into the design and arrangement of those cooking devices on the transportation unit. The dominant geometric shapes in most kitchens and outdoor cooking systems are either squares or rectangles. But a triangular shape has always been an important element of a kitchen's design and functionality. The so-called "work triangle" is defined by the National Kitchen and Bath Association (the NKBA) as an imaginary straight line drawn from the center of the sink, to the center of the cooking device area, to the center of the refrigerator, and finally back to the sink. Such an arrangement provides not only more efficient use of the cook's energy, but this triangular design also prevents major traffic patterns from crossing through the triangle. Therefore, one major goal of the Kitchen Triangle is to keep all the major work stations near the cook without placing them so closely together that the kitchen becomes cramped. An additional goal is to minimize traffic within the kitchen area so that the cook doesn't have to struggle with interruptions and interferences.

As a result of these several issues noted above, it can be very difficult to complete the process of transporting, setting up, and using cooking devices that are capable of providing efficient, compact, and safe cooking of multiple foods at the same location by using only outdoor cooking apparatus currently found in the art. It would be desirable to have an apparatus that can be transported to a location and then set up quickly into an adjustable outdoor cooking system that would provide safe operation of multiple cooking devices arranged in an efficient manner that would include the potential for arranging the outdoor cooking system in an arrangement as closely as possible to the Kitchen Triangle.

It would also be desirable to have an apparatus that can be transported to a location and then set up quickly into an adjustable multi-unit working platform system that would provide a set of multiple work areas mounted onto the work platform such that each individual work area can be positioned and oriented in a manner that enhances the operating efficiency of each work area.

SUMMARY OF THE INVENTION

This section provides a general summary of the disclosure, and is not a comprehensive disclosure of its full scope or all of its features.

In accordance with the various embodiments of the present invention, this invention relates to a uniquely designed Working Platform With Multiple Adjustable Work Areas that provides more efficient and safe work areas for general use in applications where there is a need for single platform that has a plurality of work areas that can be individually adjusted and positioned in a manner that allows for various adjustments and placements of the multiple work areas to best suit the needs of the specific application of the apparatus.

DESCRIPTION OF THE DRAWINGS

In the accompanying drawings which form part of the specification:

FIG. 5 is a perspective view of an alternate embodiment of the present invention that shows incorporation of multiple work areas onto a single platform; and, FIG. 5A is a front view of is a partial vertical section view showing one method of movably disposing work areas to the platform in an alternative embodiment of the present invention.

Corresponding reference numerals indicate corresponding steps or parts throughout the several figures of the drawings.

While specific embodiments of the present invention are illustrated in the above referenced drawings and in the following description, it is understood that the embodiments shown are merely some examples of various preferred embodiments and are offered for the purpose of illustration only, and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF AT LEAST ONE PREFERRED EMBODIMENT OF THE INVENTION

In the following description, numerous specific details are set forth such as examples of some preferred embodiments, specific components, devices, and methods, in order to provide a thorough understanding of embodiments of the present disclosure. It will be apparent to a person of ordinary skill in the art that these specific details need not be exclusively employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill.

At least one preferred embodiment of the present invention is illustrated in the drawings and figures contained within this specification. More specifically, certain preferred embodiments of the present invention are generally disclosed and described in FIG. 1 through FIG. 5A.

Figure 1:
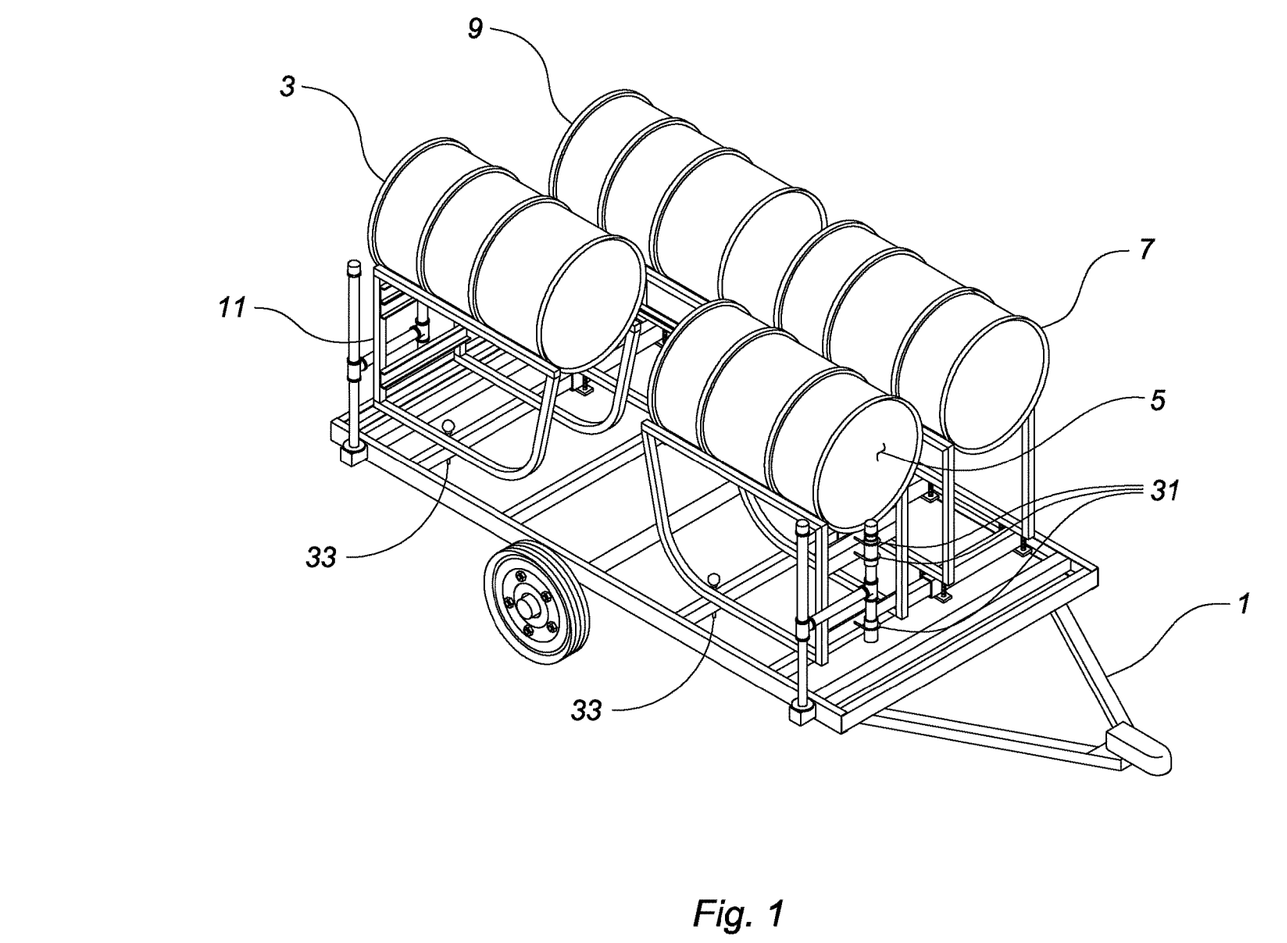
FIG. 1 is a front perspective view of one embodiment of the present invention.

One embodiment of the present invention of a Multi Unit Transportable Outdoor Cooking Apparatus A is shown in FIG. 1. In this embodiment, the Multi Unit Outdoor Cooking Apparatus A generally includes a transport unit 1 upon which four cooking devices 3, 5, 7, and 9 have been adjustably and movably mounted to the cooking device framework 11 that has itself been attached onto the transport unit 1. It is understood that FIG. 1 shows how one embodiment of the present invention can be positioned on the transport unit 1 for storing or for transporting the Multi Unit Outdoor Cooking Apparatus A from a first location to a second location where the Multi Unit Outdoor Cooking Apparatus will be used for outdoor cooking at an outdoor event.

In the current embodiment the transport unit 1 is a wheeled trailer having a flat upper surface upon which certain components of various embodiments of the invention are directly or indirectly mounted. In alternative embodiments, the transport unit 1 includes a self-mobilizing device such as a car or a truck. In fact, any other type of self mobilizing or non-self mobilizing unit can be used and remain within the scope of the invention as long as the transport unit selected is capable of transporting the components of any embodiment of the present invention in arrangements as noted or suggested herein such that the components can function and operates as noted herein.

When the Multi Unit Outdoor Cooking Apparatus A has arrived at the event, the current embodiment of the invention will be assembled and adjusted as needed to allow the cook to access each cooking device and prepare whatever types of food will be prepared at the event. This adjustment will include positioning each of the cooking devices 3, 5, 7, and 9 as needed to allow each particular cooking device to properly prepare the food. This includes such considerations as the type of food being prepared, the temperature needed to properly cook and prepare each type of food, the time needed to prepare each type of food within each cooking device, and which cooking device will be most used or least used during the cooking process.

The adjustment of the cooking devices, 3, 5, 7, and 9 is accomplished by individually positioning each of the cooking devices as needed. In the current embodiment, the adjustment process would begin with the location of cooking devices 3 and 5. It is noted that each of the first and second cooking devices 3 and 5 are pivotally disposed onto the framework 11 by use of two pivot assemblies 13 (FIG. 2) that connect each of the cooking devices 3 and 5 to the framework. The third and fourth cooking devices 7 and 9 are slideably attached to the transport unit 1 to allow those devices to be slid horizontally on the transport unit. More specifically, FIG. 3A and FIG. 3B show an embodiment of the present invention wherein FIG. 3A shows the invention in a stored orientation for transport and storage of the invention, while FIG. 3B shows an embodiment of the invention in an operational arrangement after the first and second cooking devices 3 and 5 have been pivoted to locate those devices horizontally, and after the third and fourth cooking devices 7 and 9 have been moved into the position where the first and second cooking devices had previously been stored.

Referring now to the pivot assemblies 13 (FIG. 2) it is noted that each of the two pivot assemblies is capable of pivoting along two separate axes with each axis having a separate pivot point. More specifically, each pivoting assembly 13 has a first pivoting element 15 and a second pivoting element 17 wherein. The first pivoting element 15 and the second pivoting element 17 connected by a cross brace 16. The first pivoting element 15 allows the cooking device 3 to pivot around a first pivoting axis 19 to allow a longitudinal axis 21 of the cooking device 3 to pivot horizontally around first pivoting axis 19 and allow the cooking device 3 to be horizontally positioned with regard to the transport unit 1 in a manner that best facilitates the position of the cooking device in view of the type of food being cooked as well as the temperature and cooking time of that particular type of food. Additionally, the second pivoting element 17 allows the cooking device 3 to pivot around the second pivoting axis 23 to allow the longitudinal axis 21 of the cooking device 3 to pivot horizontally around first pivoting axis 23 and allow the cooking device 3 to again be horizontally positioned with regard to the transport unit 1 in a manner that best facilitates the position of the cooking device in view of the type of food being cooked.

It will be appreciated that this dual pivoting action as provided by each of the two pivoting assemblies 13 gives the cook a much wider range of adjustment for the first cooking device 3. This is to say, the central portion of the first cooking device 3 can be adjusted to locate the first cooking device through a wide range of positions to achieve the best position for use of the cooking device at the specific location of an outdoor cooking event.

Figure 2:
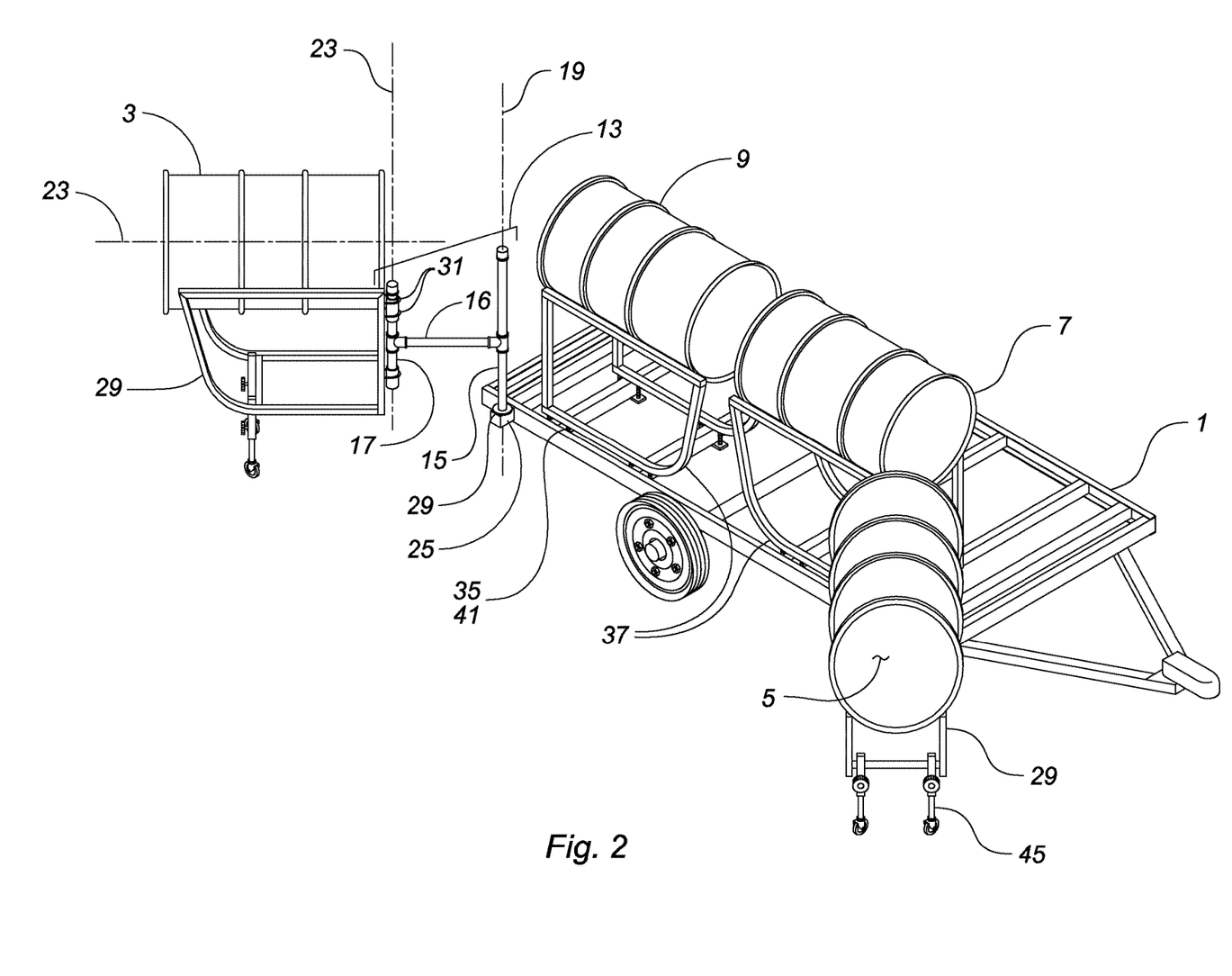
FIG. 2 is a front perspective view of one embodiment of the present invention showing one arrangement of the components of the invention after the invention has been transported to a location and readied for use.
Figure 3A:
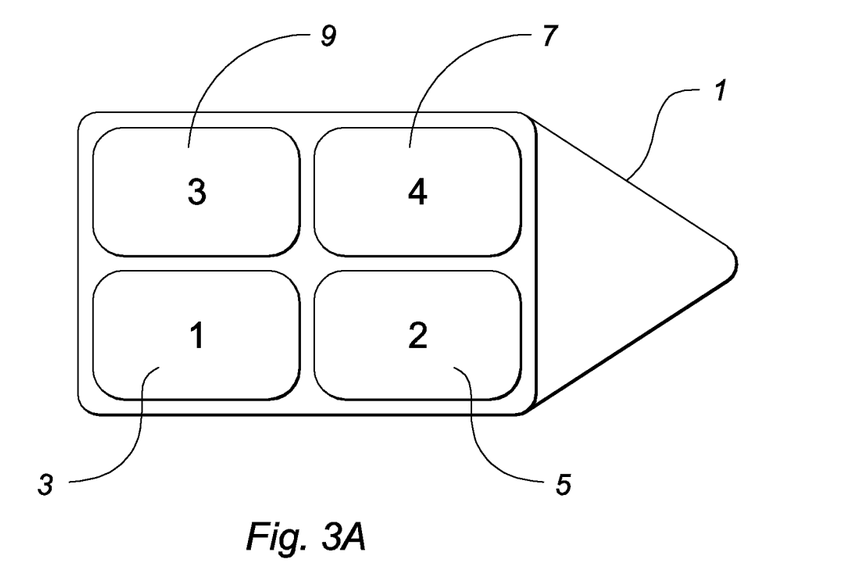
FIG. 3A is a top view of one embodiment of the present invention showing the cooking devices positioned for storage or shipment.
Figure 3B:
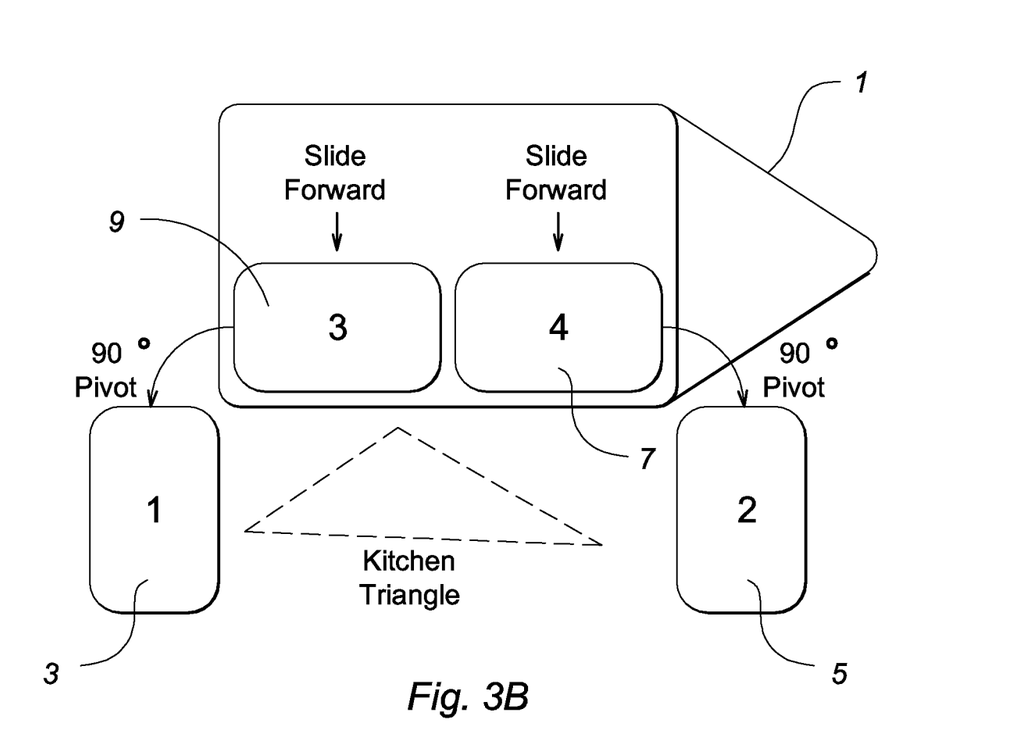
FIG. 3B is a top view of one embodiment of the present invention showing the cooking devices arranged in an exemplary position for use.

It is understood that the second cooking device 5 has a pivoting assembly 13 that is similar to the pivoting assembly for the first cooking device with the difference being the pivoting assembly for the second cooking device is disposed at a different corner of the transport unit 1 as shown in FIG. 1 and FIG. 2.

In the present embodiment, each of the two pivoting assemblies 13 is generally constructed of various metal pipe sections such as tubes, tees, elbows, and caps arranged as shown in FIG. 2. The first pivoting element 15 pivots on a mounting element 25 attached to an outer edge 27 the transport unit 1. A flange 27 is attached to the end portion of the first rotating element 15 in a manner that allows a bottom portion of the first pivoting element 15 to be rotatably located within an opening of the mounting element 25. This allows the first pivoting assembly to rotate around the first pivoting axis 19.

The second pivoting element 17 is mounted onto a cooking device platform 29 by three U bolt assemblies 31. It is understood that the U bolt assemblies 31 are sized, configured, and mounted such as to allow the vertical components of the second pivoting element 17 freely rotate within the U bolt assembly.

When the first and second cooking devices 3 and 5 are not in use and have been positioned onto the transport unit 1 for movement to another location, each of the first cooking device platforms 29 are retained into the stored position by at least one retention assembly 33. In the present embodiment, the retention assembly 33 is a retention pin located to operatively connect each of the two first cooking device platforms 29 to the transport unit 1. It is understood that any type of retention assembly may be used, however, as long as the coking device platforms are secured to the transport unit 1 for movement.

It will also be appreciated by those of skill in the art that other types of components and arrangements can be incorporated into the various embodiments of the present invention and still remain within the intended scope of those inventions as long as the other pivot methods provide the dual axis arrangement that allows each of the first cooking device 3 and the second cooking device 5 to rotate horizontally in a plane substantially parallel to the top of the transport unit frame. In alternative methods for allowing the first and second pivoting elements 15 and 17 to rotate, other methods can be incorporated to replace the mounting element 25 method for the first rotating element 15 and the U bolt method for the second pivoting element 17. For example, bearings may be used as the rotation element that allows each pivoting element to rotate horizontally and still be within the intended scope of certain of the embodiments of the present invention. In fact, any type of structure or component arrangement may be used as long as the structure selected allows each of the first cooking 3 and the second cooking device 5 to be individually rotated around at least one vertical axis of at least one of the pivoting assemblies 13.

It is also noted that the first cooking device platforms 29 may be of any size or configuration as long as the cooking device platform is strong enough to support the selected cooking device and is securely attached to the pivoting elements and allows the cooking devices to rotate as described herein.

In yet other embodiments of the present invention, each of the first cooking device platforms 29 of the first cooking device 3 and the second cooking device 5 include a leveling support 45 (FIG. 2) operationally and pivotally connected to a structural member of the first cooking platform. The pivotal connection of the level supports 45 allows the level supports to be stored in a position horizontally and then swung downward to a vertical position when the leveling supports are needed to set and maintain the level of the first and second cooking devices 3 and 5. After the first and second cooking devices 3 and 5 have been positioned as desired in relation to the transport unit 1, the leveling supports 45 are adjusted as needed to level the first and second cooking devices.

After the first cooking device 3 and the second cooking device 5 have been moved from their stored position and into the operational position rotated away from the transport unit 1, the third cooking device 7 and the fourth cooking device 9 are then relocated from their stored positions and into an operational position. This is done by first removing each retention assembly 33 that locks the third and fourth cooking devices 7 and 9 into position on the transport unit and then sliding each of the third and fourth cooking units from one side of the transport unit 1 to another side of the transport unit as shown in FIG. 2. It is understood that each of the third and fourth cooking devices 7 and 9 are mounted onto a second platform 37.

Figures 4, 4A:
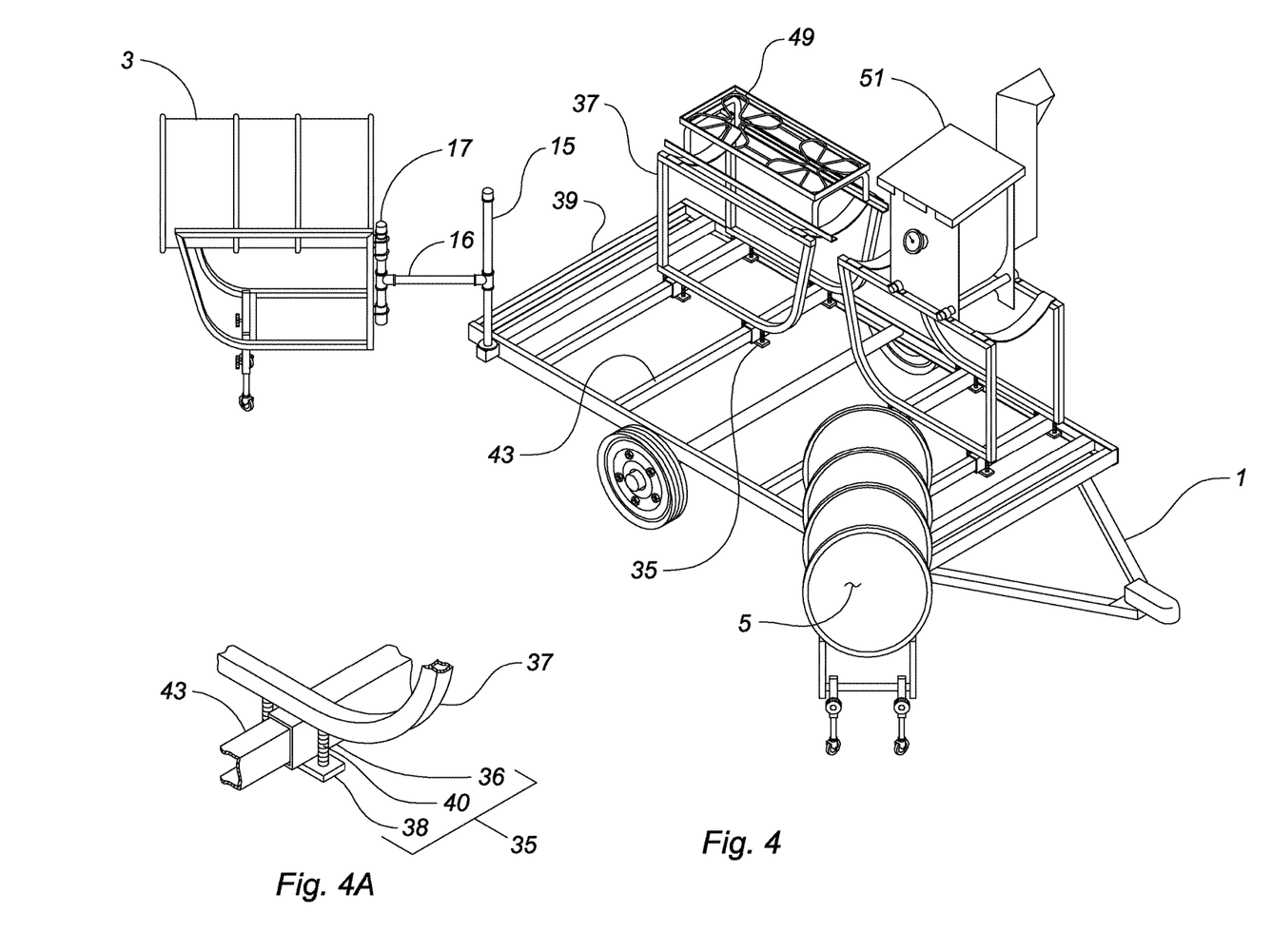
FIG. 4 is a perspective view of one embodiment of the present invention showing the use of different and alternative cooking devices mounted onto the transport unit.
FIG. 4A is a partial vertical section view showing one method of movably disposing work area to the platform.

In the current embodiment, a set of repositioning elements 35 (FIG. 4 and FIG. 4A) are disposed between the bottom of the second platforms 37 and the top of the structural frame 39 of the transport unit 1. Each of the set of repositioning elements 35 of this embodiment comprises two slide elements 36, four straps 38, and eight fastener sets 40. Each of the fasteners sets 40 includes at least one bolt and one nut. The slide elements 36 of the current embodiment are rectangular tubes sized and shaped to allow the cross member 43 of the structural frame 39 to slide within the interior rectangular area of the slide element 36. Installation first includes inserting the cross member 43 through the interior rectangular area of the slide element 36. Then the second platform 37 is located on the upper surfaces of each of the slide elements 36 after which the second platform is held against the two slide element by placing each of the four straps 38 and the four fastener sets 40 as shown in FIG. 4 and FIG. 4A by passing the bolts through two first mounting openings near each end of each strap and then through two second openings located in the bottom portion of the second platform 37. When all eight of the fastener sets 40 are tightened, the second platform 37 is connected to the two slide elements 36 to permit the second platform to operate in unison with the slide elements when the repositioning elements 35 are used to reposition the cooking devices 7 and 9 on the transport unit 1.

It will be appreciated by those of skill in the art that other component designs and arrangements may be used as repositioning elements and remain within the intended scope of the current invention. For example, other embodiments of the repositioning elements can include Teflon® or other low friction surface(s) that permit the platforms to move horizontally on the transport unit 1. In yet other embodiments, the repositioning elements can comprise rolling elements, or a combination of roller elements and rails. In fact, any other type of devices and combinations of devices can be used as the repositioning elements as long as the selected devices permit the related cooking devices to be horizontally repositioned on the transport unit.

When positioned near the edge of the transport unit 1, the third and fourth cooking devices 7 and 9 are now positioned to work simultaneously with the previously positioned first and second cooking devices 3 and 5. It is understood that the final position of each of the four cooking devices 3, 5, 7, and 9 can be adjusted as needed by the cook to allow for the most efficient and safe location for each of the cooking devices. It will also be appreciated that the final positioning of the four cooking devices as allowed by the current embodiments of the invention generated the Kitchen Triangle that will enhance the overall operations that normally occur during the outdoor cooking of foods.

In certain of the current embodiments, the cooking devices are generally shown as being cylindrically shaped devices that are normally used as BBQ pits to contained charcoal or other types of wood that are to be burned to generate the heat for cooking in those types of cooking devices. It will be fully appreciated by those of skill in the art, however, that alternative embodiments of the present invention allow for the use of various types of cooking devices and still remain within the intended scope. For example, in an alternative embodiment the cooking devices are propane burners that can be used to heat food within various types of pots and pans. In other embodiments, the cooking device can be in the form of a smoker that can be used to smoke and cure meets within them over long periods of time. In yet other embodiments, the cooking device can be a deep fryer. In fact, any type of cooking device may be used within various embodiments of the present invention as long as the cooking device selected is appropriate for the type of food being cooked during the use of the invention. Similarly, it will also be appreciated that there are yet other alternative embodiments of the present invention wherein each of the four cooking devices as shown and described herein can be of different types. For example, cooking devices 3 and 5 (FIG. 4) may be charcoal burning devices, cooking device 49 may be a propane cooking device, and cooking device 51 can be a deep fryer. Each of these combinations as well as other combinations of cooking devices can be used and still fall within the scope of various embodiments of the present invention. One example of these multiple combinations of cooking devices is shown in FIG. 4 where wood burning BBQ pits are combined with a propane-fueled cooking device mounted together with a deep fryer device. In fact, any type of cooking device can used with certain embodiments of the invention as long as the positioning of the cooking devices incorporates the dual axes pivoting of the cooking devices and allow the selected cooking devices to be stored and positioned as noted above.

Additionally, although the embodiments of the present invention can be used at a wide range of outdoor events, yet other embodiments of the invention include a display mounting device upon which marketing or informational notices can be mounted and displayed. For example, if the outdoor event is a wedding, a "Good Wishes" notice can be mounted onto the display device to wish the bride and groom the best of luck. In other cases, a business might wish to identify the name of their company on the display frame. The content of the display can be of any type as long as the content fits the size of the display being mounted onto the display mounting frame of those embodiments.

Figures 5, 5A:
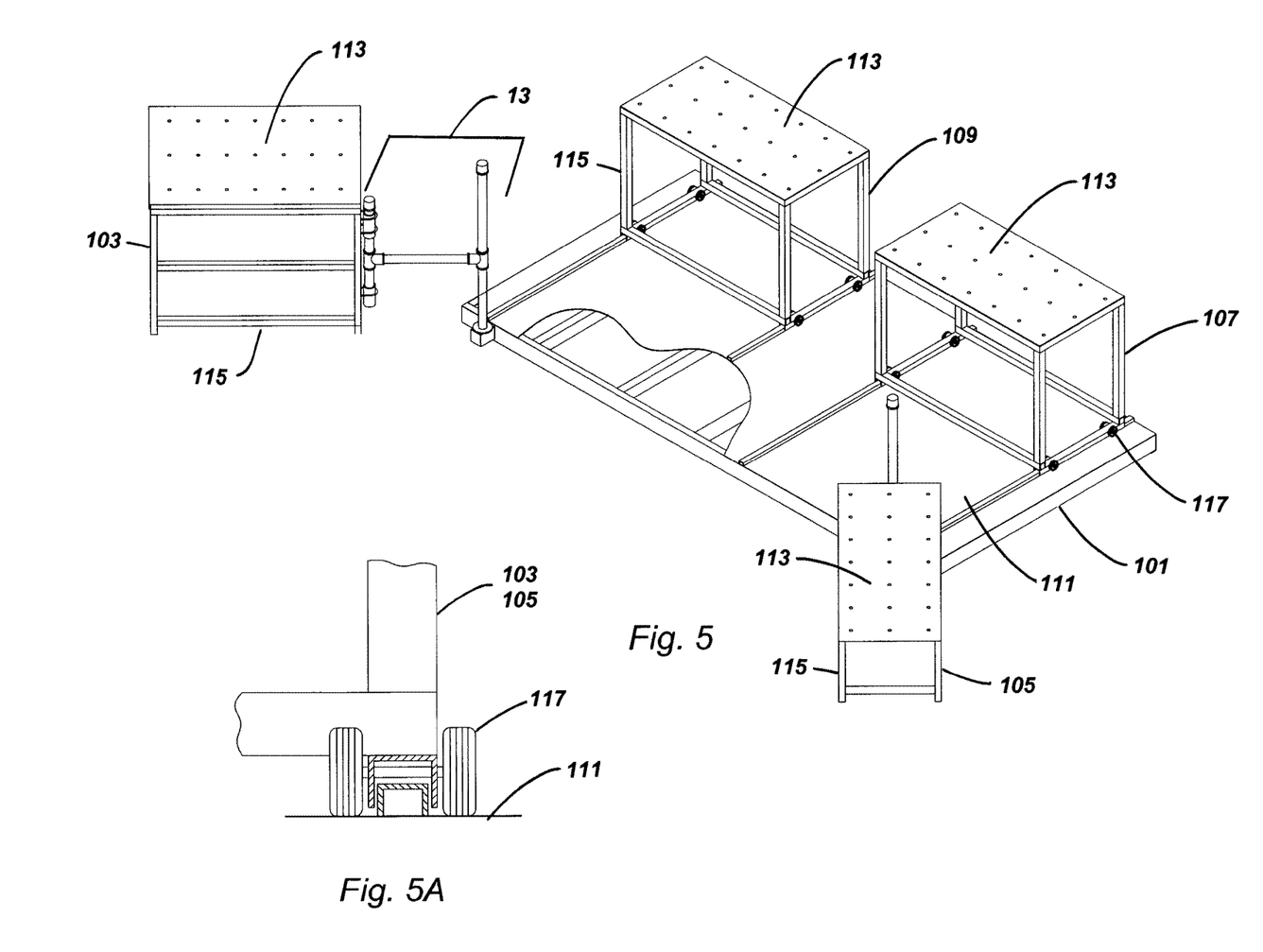

An alternative embodiment of the present invention of a Platform Having Multiple Adjustable Work Areas B is shown in FIG. 5. In this embodiment, the Platform Having Multiple Adjustable Work Areas B generally includes a platform 101 upon which a first work area 103, a second work area 105, a third work area 107, and a fourth work area 109 have been adjustably mounted to the platform 101.

In the current embodiment, the platform 101 has an upper surface 111 upon which each of the plurality of work areas 103 through 109 are directly or indirectly mounted. In alternative embodiments, the platform 101 may have legs disposed onto the underside of the platform to place the height of the plurality of work areas at the best vertical positions for use. In yet other alternative embodiments, the platform 101 may also include a plurality of location adjustment devices 117 to allow the work areas 107 and 109 to be positioned and then repositioned at other work locations. The plurality of location adjustment devices 117 can be any type of device that makes the work areas 107 and 109 capable of relocation. For example, the plurality of location adjustment devices 117 can be wheels, rollers, motors, slides, pivots, or any other similar device as long as the chosen device allows the applicable work area to be readily located and then relocated. In yet other embodiments the Platform Having Multiple Adjustable Work Areas B, devices similar to that noted in the above embodiments and as defined in FIG. 4A may also be used and remain within the intended scope of the present claims.

It is understood that while the embodiment of the present invention as shown on FIG. 5 discloses a device that is generally intended to be semi-permanent in its working position, those of skill in the art will appreciate that in other applications a mobile transport device 1 similar to that show in FIG. 1 and FIG. 2 may be incorporated within the current embodiment when the specific application requires that the platform 101 needs to be more transportable. Also, as noted in the earlier embodiment shown in FIG. 1 through FIG. 3, the transport unit 1 can include a self-mobilizing device such as a car or a truck. In fact, any other type of self-mobilizing or non-self-mobilizing unit can be used and remain within the scope of the invention as long as the transport unit selected is capable of transporting the components of any embodiment of the present invention.

In operation, the current embodiment of the Platform Having Multiple Adjustable Work Areas B is positioned at the location where it can be best used to perform its specific functions. After general positioning of the entire Platform Having Multiple Adjustable Work Areas B, each of the work areas 103 through 109 are adjusted as needed to place each individual working area into the position needed to allow any device or assembly mounted onto each work area to perform its intended function.

The adjustment of the work areas 103, 105, 107, and 109 is accomplished by individually positioning each of the work areas as needed. In the current embodiment, the adjustment process would begin with adjusting the location of work areas 103 and 105. It is noted that each of the first and second work areas 103 and 105 are pivotally disposed onto the platform 101 by use of two pivot assemblies 13. The third and fourth work areas 107 and 109 are movably attached to the platform 101 to allow those work areas to be moved horizontally on the platform.

It is understood that the two pivot assemblies 13 in the present embodiment are the same as shown and described for the above described mobile BBQ embodiment—both in arrangement and in general operation. More specifically, FIG. 2 shows and describes the pivot assemblies 13 that are used within the present embodiment for the work areas 103 and 105.

When not in use, each of the work areas 103 through 109 are in a stored position on the platform 101. In that stored position, the four work areas 103 through 109 are placed into location similar to that shown for the cooking devices 1 through 4 for the mobile BBQ embodiment shown above and as shown in FIG. 3A and FIG. 3B wherein FIG. 3A shows where the work areas 103 through 109 in an orientation for storage of the work areas 103 through 109, while FIG. 3B shows the present embodiment in an operational arrangement after the first and second work areas 103 and 105 have been pivoted to locate those devices horizontally, and after the third and fourth work areas 103 and 105 have been moved into the position where the first and second work areas had previously been stored.

It will be appreciated that the same dual pivoting action as provided by each of the two pivoting assemblies 13 in an earlier embodiment of the invention as disclosed herein gives the present embodiment a much wider range of adjustment for the first and second work areas 103 and 105. This is to say, the first work areas 103 and 105 can be adjusted to locate those work areas through a wide range of positions to achieve the best position for use of the work areas for the specific application of the present embodiment.

In the present embodiment, each of the four work areas 103 through 109 comprise a mounting element 113 mounted onto a frame assembly 115. In the present embodiment, the mounting element 113 is flat work surface upon which a variety of work devices can be mounted. It is understood and appreciated that the mounting element 113 for each of the work areas 103 through 109 can be individually designed and constructed as needed to allow for the placement of any type of work device intended for operation on any of the work areas 103 through 109. This is to say, the design of each mounting element 113 for any work area 103 through 109 can be modified as needed and each work area can be uniquely designed to match and mount the work device that needs to be placed upon each individual work area.

It is also noted that the work areas 103 through 105 may be of any size or configuration as long as each individual work area is strong enough to support the selected work area and is securely attached to the pivoting elements 13 and allows the work areas to rotate as described herein.

When the first and second work areas 103 and 105 are not in use and have been positioned on the platform 101 for storage, each of the work areas 103 and 105 are retained in the stored position by at least one retention assembly 33 (FIG. 1). In the present embodiment, the retention assembly 33 is a retention pin located to operatively connect each of the two first work areas 103 (FIG. 5) and 105 to the platform 101. It is understood that any type of retention assembly may be used, however, as long as the work areas 103 and 105 are secured to the platform 101 for storage.

It will also be appreciated by those of skill in the art that other types of components and arrangements can be incorporated into the various embodiments of the present invention and still remain within the intended scope of those inventions as long as the other pivot methods provide the dual axis arrangement that allows each of work area 103 and 105 to rotate horizontally in a plane substantially parallel to the upper surface 111 of the platform 101.

After the work areas 103 and 105 have been moved from their stored position and into the operational position rotated away from the platform 101, the work areas 107 and 109 are then relocated from their stored positions and into an operational position. This is done by first removing each retention assembly 33 (FIG. 1) that locks the work areas 107 (FIG. 5) and 109 into position on the platform 101 and then moving each of the work areas from one side of the platform to another side of the platform similar to the positioning shown in FIG. 2.

When positioned near the edge of the platform 101 (FIG. 5), work areas 107 and 109 are now positioned to work simultaneously with the previously positioned work areas 103 and 105. It is understood that the final position of each of the four work areas 103 through 109 can be adjusted as needed for the most efficient and safe location for each work area.

In the preceding description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill. The scope of the invention should be determined by any appended claims and their legal equivalents, rather than by the examples given.

Additionally, it will be seen in the above disclosure that several of the intended purposes of the invention are achieved, and other advantageous and useful results are attained. As various changes could be made in the above constructions without departing from the scope of the invention, it is intended that all matter contained in the above descriptions or shown in the accompanying drawings shall be interpreted as illustrative and not in a limiting sense.

Terms such as "proximate," "distal," "upper," "lower," "inner," "outer," "inwardly," "outwardly," "exterior," "interior," and the like when used herein refer to positions of the respective elements as they are shown in the accompanying drawings, and the disclosure is not necessarily limited to such positions. Terms such as "first," "second," and other numerical terms when used herein do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will also be understood that when an element is referred to as being "operatively connected," "connected," "coupled," "engaged," or "engageable" to and/or with another element, it can be directly connected, coupled, engaged, engageable to and/or with the other element or intervening elements may be present. In contrast, when an element is referred to as being "directly connected," "directly coupled," "directly engaged," or "directly engageable" to another element, there are no intervening elements present. Other words used to describe the relationship between elements should be interpreted in a like fashion (e.g., "between" versus "directly between," "adjacent" versus "directly adjacent," etc.).

What is claimed is:

1. An apparatus having multiple adjustable work areas comprising:
   a platform having an upper surface;
   at least one of either a first work area and a second work area disposed on the upper surface of the platform wherein a pivot assembly operationally connects at least one of either the first work area and the second work area to the platform, and wherein the pivot assembly includes two vertical axes for horizontal positioning of at least one of either the first work area and the second work area in relation to a plane of the upper surface of the platform; and
   at least one of either a third work area and a fourth work area on the upper surface of the platform wherein at least one location adjustment device operationally connects at least one of the third work area and the fourth work area to the upper surface of the platform wherein the at least one location adjustment device allows one of either the third work area and the fourth work area to be relocated from a first position on the upper surface of the platform to a second position on the upper surface of the platform.

2. The apparatus having multiple adjustable work areas of claim 1 further including means for horizontally pivoting the at least one of either the first work area and the second work area in a plane substantially parallel to the plane of the upper surface of the platform wherein that means includes two vertical axes.

3. The apparatus having multiple adjustable work areas of claim 1 wherein the pivot assembly further comprises includes a first pivoting element and a second pivoting element that provide two vertical axes for pivoting the pivot assembly horizontally and generally parallel to the plane of the upper surface of the platform.

4. The apparatus having multiple adjustable work areas of claim 3 wherein the first pivoting element pivots on a mounting element attached to the platform unit and wherein the first pivoting element comprises a flange attached to an end portion of the first pivoting element in a manner that allows a bottom portion of the first pivoting element to be rotatably located within an opening of the mounting block to allow the first pivoting element to rotate around the first pivoting axis.

5. The apparatus having multiple adjustable work areas of claim 4 wherein the second pivoting element pivots one of either the first work area or the second work area around a second pivoting axis to further allow the longitudinal axis of one of either the first work area or the second work area to pivot horizontally and substantially parallel to plane of the upper surface of the platform.

6. The apparatus having multiple adjustable work areas of claim 5 further comprising a set of retention devices operationally mounted to one of either the first work area and the second area wherein each of the set of retention devices maintain the positions one of either the first work area and the second work area in a stored position on the platform.

7. The apparatus having multiple adjustable work areas of claim 6 wherein one of either the first work area, the second work area, the third work area, and the fourth work area includes a mounting element designed to mount a work device.

8. An apparatus having multiple adjustable work areas comprising:
   a platform having an upper surface;
   at least one of either a first work area and a second work area disposed on the upper surface of the platform, wherein a pivot assembly operationally connects at least one of either the first work area and the second work area to the platform, and wherein the pivot assembly further comprises includes a first pivoting element and a second pivoting element that provide two vertical axes for pivoting the pivot assembly horizontally and generally parallel to the plane of the upper surface of the platform; and
   at least one of either a third work area and a fourth work area on the upper surface of the platform wherein at least one location adjustment device operationally connects at least one of the third work area and the fourth work area to the upper surface of the platform wherein the at least one location adjustment device allows one of either the third work area and the fourth work area to be relocated from a first position on the upper surface of the platform to a second position on the upper surface of the platform.

9. The apparatus having multiple adjustable work areas of claim 8 wherein the first pivoting element pivots on a mounting element attached to the platform unit and wherein the first pivoting element comprises a flange attached to an end portion of the first pivoting element in a manner that allows a bottom portion of the first pivoting element to be rotatably located within an opening of the mounting block to allow the first pivoting element to rotate around the first pivoting axis.

10. The apparatus having multiple adjustable work areas of claim 9 further comprising a set of retention devices operationally mounted to one of either the first work area and the second area wherein each of the set of retention devices maintain the positions one of either the first work area and the second work area in a stored position on the platform.

11. The apparatus having multiple adjustable work areas of claim 10 wherein one of either the first work area, the second work area, the third work area, and the fourth work area includes a mounting element designed to mount a work device.

\* \* \* \* \*